(12) United States Patent
Zhou

(10) Patent No.: US 10,648,412 B2
(45) Date of Patent: May 12, 2020

(54) CONTROL METHOD OF INTERNAL COMBUSTION ENGINE AND INTERNAL COMBUSTION ENGINE APPLYING THE SAME

(71) Applicant: Xiangjin Zhou, Beijing (CN)

(72) Inventor: Xiangjin Zhou, Beijing (CN)

( * ) Notice: Subject to any disclaimer, the term of this patent is extended or adjusted under 35 U.S.C. 154(b) by 1124 days.

(21) Appl. No.: 14/737,589

(22) Filed: Jun. 12, 2015

(65) Prior Publication Data

US 2015/0300280 A1 Oct. 22, 2015

Related U.S. Application Data

(63) Continuation-in-part of application No. PCT/CN2013/001550, filed on Dec. 11, 2013.

(51) Int. Cl.
*F02D 41/00* (2006.01)
*F02D 41/30* (2006.01)
*F02D 35/02* (2006.01)

(52) U.S. Cl.
CPC ....... *F02D 41/0002* (2013.01); *F02D 35/023* (2013.01); *F02D 35/025* (2013.01); *F02D 35/027* (2013.01); *F02D 41/0082* (2013.01); *F02D 41/3035* (2013.01); *F02D 41/0025* (2013.01); *F02D 2200/0612* (2013.01); *Y02T 10/42* (2013.01)

(58) Field of Classification Search
CPC .. F02D 41/0002; F02D 35/027; F02D 35/025; F02D 35/023; F02D 41/0082; F02D 41/3035; F02D 2200/0612; F02D 41/0025; Y02T 10/42
See application file for complete search history.

(56) References Cited

U.S. PATENT DOCUMENTS

| | | | | |
|---|---|---|---|---|
| 2006/0254550 A1* | 11/2006 | Lewis | ...................... | F01L 9/04 |
| | | | | 123/179.3 |
| 2008/0035125 A1* | 2/2008 | Jankovic | ............. | F02D 13/0234 |
| | | | | 123/556 |
| 2008/0306672 A1* | 12/2008 | Bauer | ................. | F02D 41/3035 |
| | | | | 701/102 |
| 2009/0205612 A1* | 8/2009 | Wermuth | ............ | F02D 41/1462 |
| | | | | 123/406.19 |
| 2009/0272362 A1* | 11/2009 | Yun | ........................... | F02B 1/12 |
| | | | | 123/295 |
| 2010/0031924 A1* | 2/2010 | Sun | .......................... | F02B 1/12 |
| | | | | 123/435 |
| 2010/0222985 A1* | 9/2010 | Yun | ........................ | F02D 37/02 |
| | | | | 701/103 |
| 2010/0319243 A1 | 12/2010 | Aradi et al. | | |
| 2013/0035841 A1* | 2/2013 | Glugla | .................... | F02D 41/22 |
| | | | | 701/105 |

FOREIGN PATENT DOCUMENTS

| | | | |
|---|---|---|---|
| CN | 101016868 A | 8/2007 | |
| CN | 101070791 A | 11/2007 | |
| CN | 101675231 A | 3/2010 | |
| CN | 101915175 A | 12/2010 | |
| CN | 102720597 A | * 10/2012 | |
| CN | 102720597 A | 10/2012 | |
| JP | 2005113912 A | 4/2005 | |
| JP | 2009097416 A | 5/2009 | |

OTHER PUBLICATIONS

WO2014089912, WO Search Report, dated Mar. 5, 2014, Xiangjin, Zhou, the whole document.
CN201210537438.4, 1st Search Report, dated May 27, 2017, Xiangjin, Zhou, the whole document.
CN201210537438.4, 2nd Search Report, dated Apr. 4, 2018, Xiangjin, Zhou, the whole document.
CN201210537438.4, 3rd Search Report, dated Dec. 5, 2018, Xiangjin, Zhou, the whole document.

* cited by examiner

*Primary Examiner* — Joseph J Dallo
*Assistant Examiner* — Kurt Philip Liethen
(74) *Attorney, Agent, or Firm* — Liu Law Office; Helen S. Liu

(57) ABSTRACT

A control method of an internal combustion engine and an internal combustion engine applying the same. Each cylinder is provided with a throttle valve, or a plurality of paralleled throttle valves are employed to supply air for different cylinders or cylinder groups, so that different cylinders are provided with different inlet pressure and inlet airflow, different spark ignition timing (phase angle), different injection timing (phase angle), and different injection quantity, and in a complete work cycle, some cylinders of the engine operate under a compression ignition combustion mode, and some cylinders of the engine operate under a spark ignition combustion mode. When the conditions for compression ignition combustion mode are satisfied, the cylinders adopt the compression ignition combustion mode as much as possible, so as to improve the thermal power efficiency of the engine. The internal combustion engine or vehicle installed with the control method has wide adaptability to different fuel with different ignition points, can detect the octane number of gasoline, and consume various octane number gasoline.

20 Claims, No Drawings

CONTROL METHOD OF INTERNAL COMBUSTION ENGINE AND INTERNAL COMBUSTION ENGINE APPLYING THE SAME

This application is a continuation-in-part of International Patent Application No. PCT/CN2013/001550 with an international filing date of Dec.13, 2013, the contents of which are incorporated herein by reference.

BACKGROUND OF THE INVENTION

The invention relates to the field of mechanical control, and more particularly to a control method of an internal combustion engine and an internal combustion engine applying the same.

FIELD OF THE INVENTION

The main components of an internal combustion engine are generally composed of a cylinder, a piston, valves, connecting rods, a crankshaft, a fuel storage and supply system, a lubrication system, etc.

The internal combustion engine is classified into spark ignition gasoline engines and compression ignition diesel engines. In general, the spark ignition gasoline engines employ throttle valves to control the air-fuel ratio, which, ideally, is controlled at around 14.7. Basically, the diesel engines have no throttle valves, thereby improving the charging efficiency to the utmost.

Typical internal combustion engines have only one combustion mode, either by spark ignition, or by compression ignition.

Existing internal combustion engines are provided with one throttle valve or no throttle valve. Diesel engines have no spark plug, while gasoline engines have spark plugs, and the control parameters (ignition phase angle and ignition timing) of the spark plugs are the same. For one engine, the fuel injection quantity, injection phase angle, and injection frequency of the cylinders are the same. Conventional cylinders of the engine have no pressure sensor and/or temperature sensor, and the air pressure is detected only on the main inlet pipe.

Cylinder grouping has been developed in recent engine technology, and by controlling the switching time of the inlet valve and the magnetic valve of the nozzle, one cylinder group can be at the rest state. For the nonworking cylinder group, no fuel injection and no air inflow are provided.

More recently, the internal combustion engine can adopt a spark ignition combustion mode or a compression ignition combustion mode at different working stages. The compression mentioned above is non-homogeneous. For the novel gasoline engine provided with both the compression ignition combustion mode and the spark ignition combustion mode (adopt the spark ignition at the starting stage of the cold vehicle, and adopt the compression ignition at the operation and staring stages of the hot vehicle with low octane number gasoline consumed), throttle valves are required to control the air-fuel ratio (generally around 14.7), to ensure the stable running of the engine at the operation stage. When the inlet pressure, inlet airflow, ambient temperature, water tank temperature and compression ratio meet the requirement for compression ignition, the compression ignition combustion mode is adopted as much as possible, so as to improve the charging efficiency of the internal combustion engine, save the fuel consumption and reduce the emission.

Up to now, in a complete operation cycle, no engine can achieve the following operation mode, that is, some cylinders adopt the spark ignition combustion mode, and some cylinders adopt the compression ignition combustion mode.

SUMMARY OF THE INVENTION

In view of the above-described problems, it is one objective of the invention to provide a method for controlling an internal combustion engine, comprising disposing two or more throttle valves for an internal combustion engine comprising two or more cylinders to control inlet pressure and inlet airflow of different cylinders or different cylinder groups. Each throttle valve supplies air for one cylinder, and the inlet pressure and inlet airflow of different cylinders are controlled by different throttle valves; or, one throttle valve supplies air for two or more cylinders, the two or more cylinders are organized as a group, the internal combustion engine comprises at least two or more cylinder groups, and the inlet pressure and inlet airflow of different cylinder groups are controlled by different throttle valves;

each cylinder is provided with an independent spark plug electronic ignition system, with independent control loop of sparking coils, independent control instruction, independent ignition operation conditions, independent phase angle for electronic ignition, independent ignition timing, and independent ignition delay time; in a complete work cycle of the internal combustion engine, the ignition phase angle and ignition delay time of each spark plug are independently preset as needed;

fuel injection quantity, injection phase angle, and injection delay time of each cylinder are independently controlled;

each cylinder is provided with a pressure sensor or a temperature sensor, or a combination thereof; for a cylinder group, one cylinder of the cylinder group is provided with a pressure sensor or a temperature sensor, or a combination thereof;

based on the control method, in some individual cylinder, fuel and air are premixed and then ignited using ignition combustion control method; meanwhile, other cylinders have high inlet pressure and large inlet air flow, after air is fully compressed in the cylinders, the fuel is injected into the cylinders and ignited using compression ignition combustion control method; the compression ignition combustion control method can also be achieved by the following mode, part of the fuel is injected into the cylinder in an intake stroke and fully premixed with the air, and most of the fuel is injected again into the cylinder in a compression stroke;

based on the control method, within a complete work cycle of the internal combustion engine, some cylinders work in a compression ignition combustion mode, and some cylinders work in an ignition combustion mode, thereby improving the adaptability of the internal combustion engine to fuel, and thus gasoline with any octane number is practicable for the internal combustion engine.

In a class of this embodiment, the internal combustion engine further comprises a throttle combination comprising two or more paralleled throttle valves; physical or mechanical structures of two or more throttle valves are connected in parallel, and a switch and opening of each throttle valve are independently controlled to adjust the inlet pressure and inlet airflow of different cylinders or different cylinder groups.

In a class of this embodiment, in the complete work cycle of the internal combustion engine, some cylinders work in a compression ignition combustion mode, and some cylinders work in an ignition combustion mode, or some cylinders are closed, and thus gasoline with any octane number is practicable for the internal combustion engine.

In a class of this embodiment, in one or several work cycles, the cylinders work in sequence according to a certain law, or are closed, so that thermal power conversion efficiency of each independent cylinder is maximized, or the cylinders are closed;

based on the requirement for meeting the power output of the internal combustion engine and maximizing the overall thermal power conversion efficiency thereof, a number of operating cylinders and control parameters of each operating cylinder are determined; an average number of operating cylinders in each operation cycle can be a non-integer, and thus after several operating cycles, a new work cycle is completed;

under such conditions, the control parameters of each operating cylinder are basically the same, and the compression ignition combustion mode or the ignition combustion mode is adopted.

In a class of this embodiment, a four-cylinder ignition combustion control method is employed; in each operation cycle, an average number of operating cylinders is one and one third, and an average number of cylinders at rest is two and two third, with sequence of ||1004|0020|0300||1004|0020|0300||.

In accordance with another embodiment of the invention, there provided is an internal combustion engine controller. Based on empirical data comprising bench test data prestored in an engine control unit (ECU), knock signal detected by a knock sensor, and cylinder combustion parameters comprising working condition parameter and working environment parameters of the internal combustion engine when the knock signal is detected, an octane number of fuel used by the internal combustion engine is determined by the internal combustion engine controller, and then, based on the octane number of the fuel, an optimum combustion control program, that is, engine management program, is selected.

In accordance with still another embodiment of the invention, there provided is an internal combustion engine, comprising an internal combustion engine controller. Based on empirical data comprising bench test data prestored in an engine control unit (ECU), knock signal detected by a knock sensor, and cylinder combustion parameters comprising working condition parameter and working environment parameters of the internal combustion engine when the knock signal is detected, an octane number of fuel used by the internal combustion engine is determined by the internal combustion engine controller, and then, based on the octane number of the fuel, an optimum combustion control program, that is, engine management program, is selected.

DETAILED DESCRIPTION OF THE EMBODIMENTS

The invention discloses an improved control mode for an internal combustion engine, that is, in a complete operation cycle (take four-stroke internal combustion engine as an example, with crankshaft rotating for two cycles), some cylinders of the internal combustion engine employ an ignition combustion mode, and some cylinders employ a compression ignition combustion mode.

For an internal combustion engine comprising more than two cylinders, two or more throttle valves are disposed to control the inlet pressure and inlet airflow of different cylinders or different cylinder groups. Specifically, one throttle valve supplies air for one cylinder (each throttle valve corresponds to a cylinder), or one throttle valve supplies air for two cylinders (for example, when the number of the cylinders are 4, 6, 8, 10 or 12, and the throttle valve is 2, 3, 4, 5, or 6 in number, and so on), or one throttle valve supplies air for a plurality of cylinders (for example, when the number of the cylinders are 4, 6, 8, 10 or 12, two throttle valves are employed; when the cylinders are 12 in number, 3 or 4 throttle valves are employed, and so on, and each two or more cylinders are organized as a group), and the internal combustion engine comprises at least two or more cylinder groups, with different inlet pressure. In another word, an internal combustion engine comprising two or more cylinders is equipped with at least two or more throttle valves, and different throttle valves have different control methods (i.e., in the same time, the openings of different throttle valves are different), so that based on different combustion control methods, the inlet pressure of different cylinders varies.

Each cylinder is provided with an independent spark plug electronic ignition system, with independent control loop of sparking coils, independent control instruction, independent ignition operation conditions, independent phase angle for electronic ignition, independent ignition timing, and independent ignition delay time; in a complete work cycle of the internal combustion engine, the ignition phase angle and ignition delay time of each spark plug are independently preset as needed.

The fuel injection quantity, injection phase angle, and injection delay time of each cylinder are independently controlled. The control parameters are the same or different.

As far as a conventional internal combustion engine is concerned, although parameters such as the ignition timing (phase angle), fuel injection quantity, injection phase angle, inlet pressure, and inlet airflow are not all the same (slightly different), and in a complete working cycle, the control parameters for different cylinders are different, the control is the same subjectively, without the aim to independently control. The difference is only slight and produced due to the fluctuation of the working conditions of the internal combustion engine, or due to the mechanical and electronic quality difference. However, in this invention, the control parameters for different cylinders are different for most of the time, and can be the same for a few time according to the requirement of the working conditions of the internal combustion engine. For example, all the cylinders adopt an ignition combustion mode, or adopt a compression ignition combustion mode.

For example, for a conventional internal combustion engine, when the load varies, the fuel injection quantity varies accordingly. When the trip computer instructs the single-cylinder fuel injection quantity to increase from 8,000 mg each time to 12,000 mg/time each time, the fuel injection quantity of each cylinder of the internal combustion engine varies with the arrival of the instruction. The cylinder who receives the instruction will works under new parameters, or all the cylinders follow the new instruction to work in sequence. The difference between the invention and conventional control methods lies in that, the control on fuel injection quantity targets a specific cylinder, and it is a purposeful control according to different combustion control methods of different cylinders.

Based on the above mentioned description, when each cylinder is provided with an independent throttle valve, the control method and internal combustion engine of the invention can be regarded as a combination of a plurality of independent single-cylinder engines. Take a four-cylinder engine as an example, actually, four independent single-cylinder engines are combined with one crank shaft or auxiliary equipment or systems, such as exhaust system or lubrication system, shared. The situation is also practicable to a six-, eight-, or twelve-cylinder engine. In addition, each single-cylinder engine is provided with the ignition combustion mode and corresponding operating capacity and the compression ignition combustion mode and corresponding operating capacity.

In the prior art, some engines adopt a control method that requires one cylinder stop fuel injection, while others continue fuel injection, for example, the cylinder group and individual control methods mentioned in the background. Actually, the control method is just one specific example of the invention, that is, one cylinder group works while another cylinder group does not work. Besides cylinder grouping and working cylinders and inoperation cylinders, the working mode of the cylinder of the invention comprises an ignition combustion mode and a compression ignition combustion mode, and the control methods of the cylinders and throttle valves are different from existing methods. In general, when the fuel injection quantity of each cylinder varies in the invention, so does the injection phase angle, which is another difference from existing technology.

Each cylinder is provided with a pressure sensor or a temperature sensor, or a combination thereof. By detecting the temperature and pressure of each cylinder as well as the changing characteristics thereof at different strokes (particularly working stroke), data comprising fuel ignition point and burning speed are analyzed, which can be used as reference to optimize and select the combustion control parameters of the engines.

Through the control method, air and fuel are premixed in a specific cylinder, and then are combusted using an ignition combustion control method. Meanwhile, other cylinders have high inlet pressure, after the air is fully compressed, fuel is injected into the cylinder and ignited by the high temperature of the compressed air (that is, compression ignition combustion control method). The compression ignition combustion control method also comprises premixing part of the fuel and air (a small amount of fuel is injected in the intake stroke, the fuel is fully mixed with air; in the working stroke, the fuel competes with nitrogen for oxygen under high temperature and high pressure conditions, thus reducing the production of oxynitride. The part of fuel will produce a small amount of hydrocarbon components, which tend to react with oxynitride and carbon monoxide in a three way catalyst system in the tail gas treatment process, to yield carbon dioxide, nitrogen, and water, and release heat), and most of the fuel is injected again into the compressed air. Based on the control method, within a complete work cycle of the internal combustion engine, some cylinders work in a compression ignition combustion mode, and some cylinders work in an ignition combustion mode, thereby improving the adaptability of the internal combustion engine to fuel, and thus gasoline with any octane number is practicable for the internal combustion engine. Even if naphtha (direct distillation gasoline) is used as fuel, the internal combustion engine can also work smoothly with high thermal power conversion efficiency.

In the initiating stage of the engine, all the cylinders adopt the ignition combustion mode so as to probe the ignition point of the fuel. After the load is increased, based on the inlet pressure and knock as well as specific working conditions (water tank temperature, ambient temperature, air pressure, intake air temperature, compression ratio. etc.), to determine whether the compression ignition combustion mode is satisfied. Or, to reduce the opening of part of throttle valves, so that the corresponding cylinders can meet the requirement for the ignition combustion mode, and to increase the opening of other throttle valves (to the utmost), and thus the inlet pressure of the corresponding cylinders are greatly enhanced, thereby meeting the requirement for the compression ignition combustion mode.

After the engine is preheated (hot vehicle), the conditions for the compression ignition combustion mode are satisfied, and the engine is started up using the ignition combustion mode or operates at low load under the ignition combustion mode. Because the air-fuel ratio is strictly controlled at about 14.7, the inlet pressure is low, and the airflow quantity is small, no shock occurs. If the knock occurs, the ignition combustion mode is converted into the compression ignition combustion mode instantly.

The cylinder with low inlet pressure adopts an ignition combustion mode by homogeneous mixture of oil and air, and the air-fuel ratio is controlled at 14.7 or 14.6. The cylinder with high inlet pressure adopts a nonhomogeneous compression combustion mode, thereby achieving stratified combustion and lean combustion.

When the octane number of the fuel is uncertain, spark plug ignition is used as an auxiliary means to the compression ignition combustion mode. In the operation stage of the compression ignition combustion mode, the spark plug ignites when the piston reaches close to the top dead center with an angle of 2 degrees, so as to prevent the failure of the compression ignition combustion mode. If knock is detected, the ignition combustion mode is activated, and the firing timing by the spark plug is gradually delayed.

Based on the control method of the invention, the engine exhibits detection capacity on the octane number of the fuel. When the bench test is used to determine the octane number of fuel corresponding to engines with given models, the data pool comprising the conditions, environment, and intensity of the knock in various working states is stored in an engine controller (or called trip computer, ECU). In practice, when a cylinder or a cylinder group operates under the ignition combustion mode and knock is detected, the ignition timing by the spark plug is delayed according to a convention control method, and the working parameters of the cylinder comprising fuel injection quantity, inlet pressure, inlet temperature (ambient temperature), rotational speed, ignition phase angle (ignition timing) of the spark plug, and torque output are collected and compared with data pool to preliminarily determine the octane number of the fuel corresponding to the engine. The comparison result can also be used to instruct the cylinders of the engine to select an ignition combustion mode or a compression ignition combustion mode. Meanwhile, the parameters of the cylinders with the ignition combustion mode are continuously detected (comprising knock, ignition phase, inlet pressure, inlet temperature, ambient temperature, water tank temperature, engine oil temperature, fuel injection quantity, rotational speed, torque output, and so on), so as to increase the statistical probability of the parameters for determining the octane number of fuel.

The internal combustion engine has function of self-learning, and when the working status is stable (the fuel injection quantity remains unchanged), the spark plug ignition timing (trial) of cylinders with the ignition combustion mode is gradually advanced, so as to improve the power output and torque output of the internal combustion engine, as well as the thermal power conversion efficiency. If the knock occurs, the spark plug ignition timing is gradually postponed. The ignition timing with relatively stable and high thermal power conversion efficiency and corresponding to the fuel injection quantity and load is selected. The trial and learning process is based on the data pool obtained from the bench test, with slight adjustment. The adjustment frequency and magnitude vary according to different control concept, which is common sense to those skilled in the art.

The control method is also applicable to engines with odd cylinders. For example, a three-cylinder engine can be equipped with three throttle valves and three (or two) control strategies are adopted, or be equipped with two throttle valves, and one cylinder adopts the ignition combustion mode, and the other two cylinders are organized as a group and adopt the same ignition combustion mode. For example, the single cylinder adopts the compression ignition combustion mode, and the other two cylinders adopt the ignition combustion mode, or a contrary control strategy is adopted according to working conditions (such as inlet pressure, inlet airflow, ambient temperature, and water tank temperature). For engines with 5, 7, 9, or 11 cylinders, the ignition combustion mode and the compression ignition combustion mode can also be arbitrarily combined.

The control method adopts two or more paralleled throttle valves. That is to say, two independent throttle valves are parallel on a throttle combination, or a plurality of independent throttle valves are parallel on a throttle combination. The switches and openings of the throttle valves are independently controlled to adjust and control the inlet pressure and inlet airflow of different cylinders (or different cylinder groups).

Each throttle combination comprises two or more independent throttle valves. The inlets of the throttle valves are connected to the same pipeline, with the same air pressure; the outlets thereof are connected to corresponding cylinders or cylinder groups, respectively. By adjusting the openings of the throttle valves, the inlet pressure and inlet airflow of the cylinders are regulated.

The compression ratio of the engines is controlled at between 9 and 22. For engines with high inlet pressure, for example, the engines equipped with a mechanical supercharging device and/or a turbocharger, the compression ratio can be slightly lower, and preferably, the compression ratio is between 12 and 20, typically, 15.

For engines with the compression ratio of 15, when the inlet pressure is 200 kilopascal (almost equal to two atmosphere), the chamber temperature at the end of the compression stroke is basically the same as that of an engine with the compression ratio of 25-28 and adopting natural aspiration. The temperature can easily ignite fuel with relatively high firing point. Particularly, if the engine is preheated (hot vehicle), with the compression ratio of 19-21 and the inlet pressure of 240-300 kilopascal, the compressed air at the end of the compression stroke can ignite almost all light oil (RON) with octane number of less than 90-95, in a compression ignition mode. The high octane gasoline which cannot be ignited by compression is ignited by park plug.

Shifting the combustion mode of the engines between the compression ignition combustion mode and the ignition combustion mode can reduce the carbon deposition of the spark plug and cylinders.

When the engine runs at a low load (for example, the vehicle runs at idle or constant-speed motion), part of cylinders can be closed (the throttle valve is closed, and the fuel supply is stopped; or stop the fuel supply while open the throttle valve or turn down the throttle valve, the work is finished by waste heat), thereby saving the fuel consumption. Specifically, within one or several work cycles, the cylinders each work or close according to a certain sequence or law (to ensure the thermal power conversion efficiency of each independent cylinder to be maximized, or be close).To meet the requirement of the power (torque) output and the strategy of maximizing the thermal power conversion efficiency, the number of cylinders needing running and the control parameters for each cylinder are determined. In each work cycle, an average number of operating cylinders can be a non-integer, for example, it is a fraction, or decimal. Thus, only after several operating cycles can a new work cycle be completed. As a result, the control parameters of operating cylinders are basically the same, with a compression ignition combustion mode, with a spark ignition combustion mode, or a hybrid ignition combustion mode thereof. In fact, the "closed" cylinder can operate at the lowest load thereby achieving the highest thermal power conversion efficiency.

For example, when a four-cylinder engine runs at idle speed, the average number of operating cylinder in each work cycle is one and one third, the average number of cylinders at rest is two and two third. Suppose the serial number of the cylinders is 1, 2, 3, and 4, the working order is ||1324|13241||, the serial number of the cylinders in operation is ||1004|0020|0300||, where "3", "2" and "0" represent closed cylinders, and after three normal operation cycles, a new work cycle starts. To maximize the overall thermal power conversion efficiency, minimize the specific fuel consumption and meet the requirement for torque output, in an operation cycle of a four-cylinder engine, the average number of operating cylinder is a fraction from 0 to 4, such as three fifth, one and one second, two and three fifth, and three and one tenth. When part of cylinders are at rest, to prevent resonance, the serial number of the cylinders in operation is controlled to occur for two successive times, and in the third operation cycle, the serial number of the cylinders is entirely advanced for one grade, in the sixth operation cycle, the serial number of the cylinders is entirely postponed for one grade, for example, ||1020||1020||1024||0304||0304||0020||1020||1020||.

The control method is also applicable to 6-, 8-, 10-, and 12-cylinder engines.

The combustion parameters of an engine include but are not limited to inlet pressure (inlet airflow), inlet temperature (ambient temperature), water tank temperature, engine oil temperature, rotational speed, spark ignition phase angle (ignition timing), fuel injection quantity, injection pressure, injection phase angle, and compression ratio. Part of the parameters are controllable, part is uncontrollable. The controllable parameters can be separately preset for different cylinders.

"Gas supply" in the invention means to supply air. In general, the crankshaft of a four-stroke internal combustion engine rotates for two cycles in a complete work cycle; the crankshaft of a two-stroke internal combustion engine rotates for one cycle in a complete work cycle; the crankshaft of a six-stroke internal combustion engine rotates for three cycles in a complete work cycle.

The selection of the control parameters of the engine and vehicle are common sense which is well-known to those skilled in the art.

U.S. Ser. No. 13/806,419 (PCTCN2011001106) and U.S. Ser. No. 14/396,481 (PCTCN2013074571) disclose relevant prior art, and the former has been issued in China.

Take a six-cylinder engine as an example, every two cylinders correspond to a throttle valve, and thus three cylinder groups are obtained (preferably, according to the working order and serial number of the cylinders, the cylinders are grouped with a two-cylinder interval. For example, the cylinders with the working order 1 and 4 are organized as a group, 2 and 5 are organized as a group, and 3 and 6 are organized as a group). One group adopts a spark ignition combustion mode. The travel computer controls the opening of the throttle valve and the fuel injection quantity of the nozzle to ensure the air-fuel ratio to be 14.7. The fuel and the air are premixed, and the spark plug ignites when the piston reaches close to the top dead center with an angle of 12 degrees. Based on the rotational speed and knock detection result (as well as the cylinder temperature, pressure detection result and the corresponding piston position), the parameters are adjusted with the top dead center with an angle of 12 degrees as a center, in the range of plus or minus 30 degrees (the calculation method of the parameters are common sense to those skill in the art). The other two cylinder groups adopt a compression ignition combustion mode, and the spark plug ignites when the piston reaches close to the top dead center with an angle of 16 degrees. The parameters can be adjusted with the top dead center with an angle of 16 degrees as a center, in the range of plus 120 degrees (advanced) or minus 20 (postponed) degrees (the calculation method of the parameters are common sense to those skill in the art), on the basis of rotational speed, load, and inlet pressure, or be obtained by a bench test.

In the starting stage of the engine, all the three cylinder groups adopt the spark ignition combustion mode, to ensure the normal starting and operation of the engines. With the normal starting of the engine, the turbo supercharger makes full use of tail gas to supply high pressure air for the cylinders (via the throttle valves). The wide-open throttle valves improve the inlet pressure of corresponding cylinders, which provides the cylinders with the possibility of the compression ignition combustion mode. In addition, the part-open throttle valves decrease the inlet airflow and inlet pressure of corresponding cylinders, so that more air is introduced to the cylinders working in a compression ignition combustion mode (the throttle valves are wide open, or the opening is greater than 50%).

In general, two cylinder groups try to adopt the spark ignition combustion mode, and one cylinder group adopts the compression ignition combustion mode. And then, one cylinder group tries to adopt the spark ignition combustion mode, and two cylinder groups adopt the compression ignition combustion mode. The instruction "try" is given by the travel computer on the basis of collected data, to determine whether (and how many) there are cylinders that meet the conditions of the compression ignition combustion mode, which cylinder (or cylinder group) can operate under the compression ignition combustion mode, and other cylinders operate under the spark ignition combustion mode.

When the inlet pressure, inlet airflow and ambient temperature cannot meet the conditions for two cylinder groups (four cylinders) to achieve the compression ignition combustion mode (the cylinders cannot be ignited by compression, or the compression ignition conditions cannot be met), to adjust one cylinder group to be ignited by compression, and two cylinder groups to be ignited by spark plug, or all the cylinder groups are ignited by spark plug.

With the increase of the water tank temperature, the inlet pressure, inlet airflow and ambient temperature meet the conditions for six cylinders to achieve the compression ignition combustion mode, and then all the six cylinders operate under the compression ignition combustion mode.

Overall control strategy: first of all, the engine can smoothly operate with different octane number gasoline as fuel under the spark ignition combustion mode; if possible, as many cylinders as possible adopt the compression ignition combustion mode, so as to improve the efficiency of the engine.

To shorten the operation duration of the cylinders under the spark ignition combustion mode at the starting stage, it is practicable to equip the engine with a mechanical supercharging device, so that the inlet pressure of the engine at the starting stage can exceed one atmosphere, which favors the cylinders of the engine to adopt the compression ignition combustion mode as many as possible. The mechanical supercharging device can work all the time within a work cycle, or only work at the starting stage. The mechanical supercharging device can cooperate with a turbo supercharger, and stops work when the turbo supercharger is activated.

Under conditions of low torque output, two cylinder groups are ignited by compression, and one cylinder group is closed, or one cylinder group is ignited by compression, and two cylinder groups are closed.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

The invention claimed is:

1. A method for controlling an internal combustion engine, comprising disposing two or more throttle valves for an internal combustion engine comprising two or more cylinders to control inlet pressure and inlet airflow of different cylinders or different cylinder groups, each cylinder or each cylinder group is provided with one throttle valves, and only one throttle valves, wherein, each throttle valve supplies air for one cylinder, and the inlet pressure and inlet airflow of different cylinders are controlled by different throttle valves; or, one throttle valve supplies air for one cylinder group when the number of cylinders meets the grouping conditions, the two or more cylinders are organized as a group, the number of cylinders in each group is the same, the internal combustion engine comprises at least two or more cylinder groups, and the inlet pressure and inlet airflow of different cylinder groups are controlled by different throttle valves;

each cylinder is provided with an independent spark plug electronic ignition system, with independent control loop of sparking coils, independent control instruction, independent ignition operation conditions, independent phase angle for electronic ignition, independent ignition timing, and independent ignition delay time; in a complete work cycle of the internal combustion engine, the ignition phase angle and ignition delay time of each spark plug are independently preset as needed;

fuel injection quantity, injection phase angle, and injection delay time of each cylinder are independently controlled;

optional configurations include: each cylinder is provided with a pressure sensor or a temperature sensor, or a combination thereof; for a cylinder group, one cylinder of the cylinder group is provided with a pressure sensor or a temperature sensor, or a combination thereof;

based on the control method, in some individual cylinder, the different inlet pressure of each cylinder can be realized due to the different opening degrees of different throttle valves, fuel and air are premixed and then ignited using spark ignition combustion control method; meanwhile, other cylinders have higher inlet pressure and larger inlet airflow, the fuel is injected into the cylinders after air is compressed in the cylinders at compression stroke and ignited using compression ignition combustion control method; the compression ignition combustion control method can also be achieved by the following mode, part of the fuel is injected into the cylinder in an intake stroke and fully premixed with the air, and most of the fuel is injected again into the cylinder in a compression stroke;

each cylinder is provided with the spark ignition combustion mode and corresponding operating capacity and the compression ignition combustion mode and corresponding operating capacity, and the capacity of closing; based on the control method, the engine has the capacity of the following operations that within a complete work cycle of the internal combustion engine, some cylinders work in a compression ignition combustion mode, and some cylinders work in a spark ignition combustion mode, or some cylinders are closed; and the gasoline with any octane number is practicable for the internal combustion engine.

2. The method of claim 1, wherein the internal combustion engine further comprises a throttle combination comprising two or more paralleled throttle valves; physical or mechanical structures of two or more throttle valves are connected in parallel, and a switch and opening of each throttle valve are independently controlled to adjust the inlet pressure and inlet airflow of different cylinders or different cylinder groups.

3. An internal combustion engine, which characterized by using the method for controlling the internal combustion engine according to claim 2.

4. The method of claim 1, wherein in the complete work cycle of the internal combustion engine, some cylinders work in a compression ignition combustion mode, and some cylinders work in a spark ignition combustion mode, or some cylinders are closed, and thus almost all light oil with octane number of less than 90-95 can be ignited in the compression ignition mode, and the high octane gasoline which cannot be ignited by compression is ignited by spark plug.

5. An internal combustion engine controller, which characterized by using the method for controlling the internal combustion engine according to claim 4.

6. An internal combustion engine, which characterized by using the method for controlling the internal combustion engine according to claim 4.

7. The method of claim 1, wherein in one or several work cycles, the cylinders work in sequence according to a certain law, or are closed, so that thermal power conversion efficiency of each independent cylinder is maximized, or the cylinders are closed;

based on the requirement for meeting the power output of the internal combustion engine and maximizing the overall thermal power conversion efficiency thereof, a number of operating cylinders and control parameters of each operating cylinder are determined; an average number of operating cylinders in each regular work cycle can be a non-integer, and thus after several regular working cycles, a new work cycle is completed.

8. The method of claim 7, wherein a four-cylinder internal combustion engine control method is employed; in each work cycle, an average number of operating cylinders is one and one third, and an average number of closed cylinders is two and two third, the new work cycle consists of three regular work cycles.

9. An internal combustion engine controller, which characterized by using the method for controlling the internal combustion engine according to claim 8.

10. An internal combustion engine, which characterized by using the method for controlling the internal combustion engine according to claim 8.

11. An internal combustion engine controller, which characterized by using the method for controlling the internal combustion engine according to claim 7.

12. An internal combustion engine, which characterized by using the method for controlling the internal combustion engine according to claim 7.

13. An internal combustion engine controller using the method for controlling an internal combustion engine according to claim 1, which includes but is not limited to central processor CPU, memory EPROM, input/output device I/O; wherein, each cylinder of the internal combustion engine is provided with the spark ignition combustion mode and corresponding operating capacity and the compression ignition combustion mode and corresponding operating capacity, and the capacity of closing, each cylinder is provided with an independent spark plug electronic ignition system, with independent control loop of sparking coils, independent control instruction, independent ignition operation conditions, independent phase angle for electronic ignition, independent ignition timing, and independent ignition delay time; in a complete work cycle of the internal combustion engine, the ignition phase angle and ignition delay time of each spark plug are independently preset as needed; fuel injection quantity, injection phase angle, and injection delay time of each cylinder are independently controlled; based on empirical data comprising bench test data prestored in the controller, an engine control unit (ECU), knock signal detected by a knock sensor, and cylinder combustion parameters comprising working condition parameter and working environment parameters of the internal combustion engine when the knock signal is detected, an octane number of fuel used by the internal combustion engine is determined by the internal combustion engine controller, and then, based on the octane number of the fuel, selecting an engine control method corresponding to the octane number of the fuel from a database of ECU, controlling certain cylinders of the engine during subsequent work to select a spark ignition combustion mode or a compression ignition combustion mode, or closing certain cylinders, an optimum combustion control program, that is, engine management program, is selected.

14. An internal combustion engine, which characterized by using the internal combustion engine controller according to claim 13.

15. An internal combustion engine using the method for controlling an internal combustion engine according to claim 1, which includes but is not limited to pistons, cylinders, injectors, spark plugs, throttle valves, knock sensors, intake pressure sensors; wherein, each cylinder of the internal combustion engine is provided with the spark ignition combustion mode and corresponding operating capacity and the compression ignition combustion mode and corresponding operating capacity, and the capacity of closing; each cylinder is provided with an independent spark plug electronic ignition system, with independent control loop of sparking coils, independent control instruction, independent ignition operation conditions, independent phase angle for electronic ignition, independent ignition timing, and independent ignition delay time; in a complete work cycle of the internal combustion engine, the ignition phase angle and ignition delay time of each spark plug are independently preset as needed; fuel injection quantity, injection phase angle, and injection delay time of each cylinder are independently controlled; the internal combustion engine comprises an internal combustion engine controller, which based on empirical data comprising bench test data prestored in the controller (ECU), knock signal detected by a knock sensor, and cylinder combustion parameters comprising working condition parameter and working environment parameters of the internal combustion engine when the knock signal is detected, an octane number of fuel used by the internal combustion engine is determined by the internal combustion engine controller, and then, based on the octane number of the fuel, selecting an engine control method corresponding to the octane number of the fuel from a database of ECU, controlling certain cylinders of the engine during subsequent work to select a spark ignition combustion mode or a compression ignition combustion mode, or closing certain cylinders, an optimum combustion control program, that is, engine management program, is selected.

16. The internal combustion engine of claim 15, which characterized by using a turbocharger or a mechanical supercharger, or a combination thereof.

17. An internal combustion engine controller, which characterized by using the method for controlling the internal combustion engine according to claim 1.

18. An internal combustion engine, which characterized by using the internal combustion engine controller according to claim 17.

19. An internal combustion engine, which characterized by using the method for controlling the internal combustion engine according to claim 1.

20. An internal combustion engine, which characterized by using the method for controlling the internal combustion engine according to claim 1, and a turbocharger or a mechanical supercharger, or a combination thereof.

* * * * *